(12) United States Patent
Gabbin

(10) Patent No.: US 6,247,686 B1
(45) Date of Patent: Jun. 19, 2001

(54) VIBRATION DAMPER BLOCK

(75) Inventor: Giuliano Gabbin, Portacomaro (IT)

(73) Assignee: GATE S.p.A., Turin (IT)

( * ) Notice: Subject to any disclaimer, the term of this patent is extended or adjusted under 35 U.S.C. 154(b) by 0 days.

(21) Appl. No.: 09/313,980

(22) Filed: May 19, 1999

(30) Foreign Application Priority Data

May 20, 1998 (IT) .............................. TO98U0093

(51) Int. Cl.$^7$ ...................................... F16H 7/00
(52) U.S. Cl. .......................................... 267/147; 267/153
(58) Field of Search ..................... 267/141, 141.1, 267/153, 140, 219, 220

(56) References Cited

U.S. PATENT DOCUMENTS

| | | |
|---|---|---|
| 1,951,013 | 3/1934 | Flintermann . |
| 2,353,952 | 7/1944 | Yerzley . |
| 2,455,891 | * 12/1948 | Flanagan ............................. 267/141 |
| 2,727,407 | 12/1955 | Richards et al. . |
| 3,586,306 | * 6/1971 | Reece et al. ........................ 267/153 |
| 3,809,427 | * 5/1974 | Bennett ............................... 267/141 |
| 4,522,378 | * 6/1985 | Nelson ................................ 267/153 |

FOREIGN PATENT DOCUMENTS

| | | |
|---|---|---|
| 0429363 | 5/1991 | (EP) . |
| 2119169 | 8/1972 | (FR) . |
| 63-038732 | 2/1988 | (JP) . |

* cited by examiner

Primary Examiner—Matthew C. Graham
(74) Attorney, Agent, or Firm—Sughrue, Mion, Zinn, Macpeak & Seas, PLLC

(57) ABSTRACT

An anti-vibration block is comprised of two substantially cylindrical coaxial end parts joined together by a cylindrical body coaxial with the end parts and of smaller section than these, the end parts and the cylindrical body defining a groove, a substantially cylindrical axial through-hole passing through the block, the end parts having on their outer faces opposite the groove pairs of projections of I and T-shape respectively.

3 Claims, 2 Drawing Sheets

VIBRATION DAMPER BLOCK

BACKGROUND OF THE INVENTION

The present invention relates to a vibration damper block, more precisely a vibration damper block for use on motor vehicles.

Problems of induced vibration exist, for example, in the region where the cooling radiator of the engine is fixed to the air duct coming from the fan or fans, and also where the fan unit is fixed to a duct.

SUMMARY OF THE INVENTION the object of the present invention is that of providing a damper block or grommet which allows a drastic reduction of the vibrations generated or transmitted by members such as, for example, cooling fans, radiators or air ducts to be obtained, which is easy to construct and of low cost.

The present invention achieves the above-stated objects by a vibration damper block formed in rubber or plastics having the characteristics specifically set out in the following claims.

BRIEF DESCRIPTION OF THE DRAWINGS

The invention will now be described with reference to the attached drawings, provided purely by way of non-limitative example, in which.

DETAILED DESCRIPTION OF THE INVENTION

Figure 1:
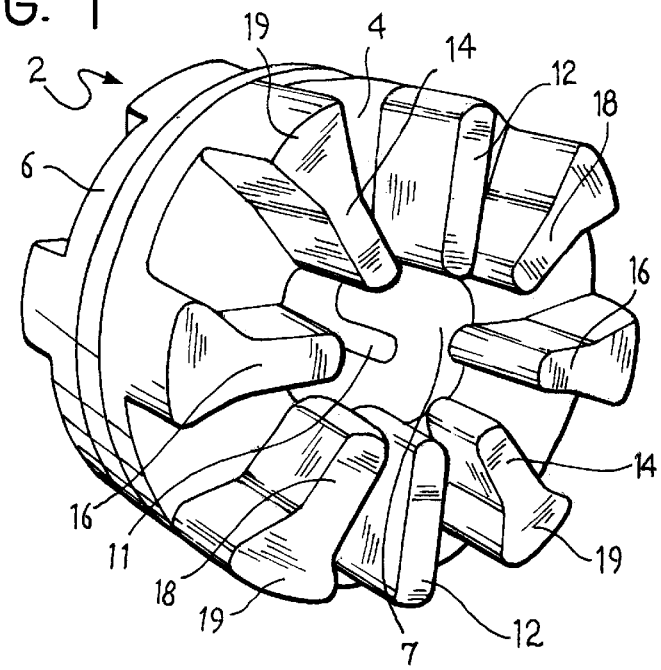
FIG. 1 is a perspective view of a damper block according to the invention.
Figure 2:
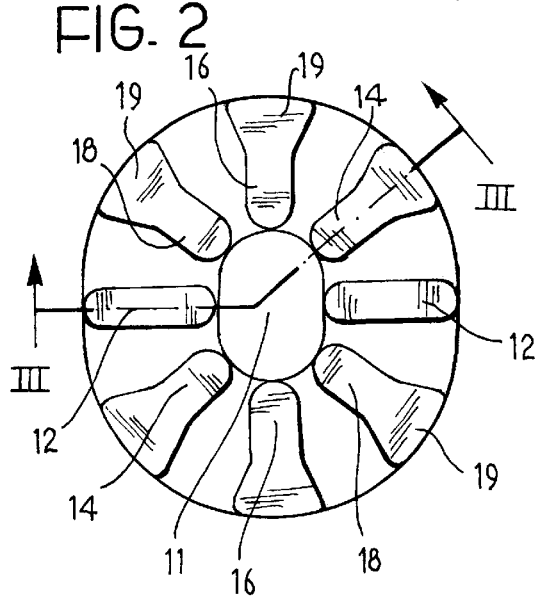
FIG. 2 is a plan view of the block of FIG. 1.
Figure 3:
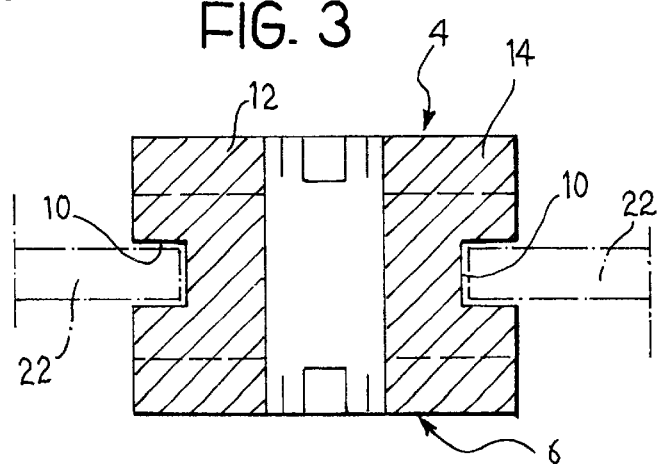
FIG. 3 is a view in section taken on the line III—III of FIG. 2.

Referring now to the drawings, where the same or corresponding parts are indicated with the same reference numerals, the vibration damper block according to the invention is generally indicated 2. The block 2 is made of rubber or plastics.

The block 2 comprises two end parts 4, 6 of cylindrical form, joined together by a cylindrical body 7 of smaller section than that of the two end parts 4 and 6, creating a groove 10 between them.

A substantially cylindrical through-hole 11 passes through the block 2; the end parts 4, 6 carry on their outer faces opposite the groove 10 a pair of projections 12 of substantially I-shape and three pairs of projections 14, 16, 18 of substantially T-shape, with enlarged mushroom heads 19 at their ends facing towards the periphery of the end parts 4, 6.

The projections of each pair of projections 12, 14, 16, 18 are diametrically opposite one another such that the pairs of projections 12, 14, 16, 18 are equally angularly spaced by about 45°.

The ends of the projections of the pairs 12, 14, 16, 18 facing the periphery of the end parts 4, 6 are curved with the same radius of curvature as the end parts 4 and 6, whilst the opposite ends are curved and projecting into the through-hole 11.

Figure 4:
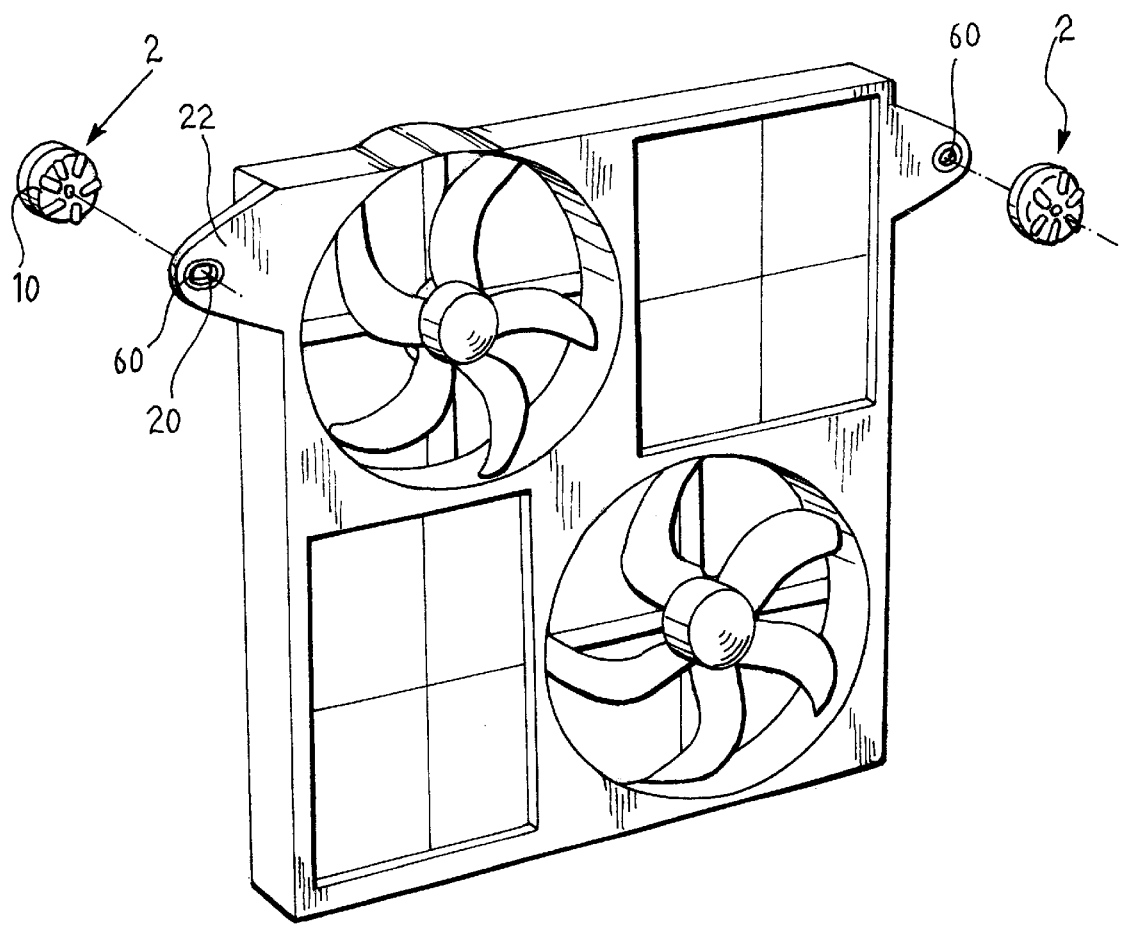
FIG. 4 illustrates the positioning of the damper block according to the invention in a fan unit.

Making specific reference to FIG. 4, in use a pair of damper blocks 2 according to the invention are introduced into holes or eyes 20 formed in fixing tabs 22 of a fan unit 40 which, purely by way of non-limitative example, is shown with two cooling fans 42 and 44, in such a way that the groove 10 cooperates with the holes 20 so that the two end parts 4 and 6 are in contact with opposite sides of the fixing tab 22.

Once the blocks 2 are inserted into the holes 20 of the fixing tabs 22 of the fan unit 40 this can be fixed in a manner known per se to an air duct or a radiator (not shown).

Spacers 60, for example of metal, can be prearranged in the holes 20 to encourage correct positioning of the blocks 2.

Naturally, the principle of the invention remaining the same, the details of construction and the embodiments can be widely varied with respect to what has been described and illustrated, without by this departing from the ambit of the present invention.

What is claimed is:

1. A vibration damper block formed of plastics or rubber, wherein it comprises two substantially coaxial end parts jointed together by a cylindrical body coaxial with the end parts and of smaller section than said end parts, said end parts and the said cylindrical body together defining a groove; a substantially cylindrical, axial through-hole passing through the block, the end parts having on their outer faces opposite the groove a pair of projections of substantially I-shape and a plurality of pairs of projections of substantially T-shape with enlarged mushroom heads at their ends facing towards the periphery of the end parts, the projections of each pair of I-shaped projections being diametrically opposite to one another.

2. A block according to claim 1, wherein said T-shaped projections of each pair of projections are equally angularly spaced.

3. A block according to claim 1, wherein the ends of the projections of each pair of T-shaped projections facing towards the periphery of the ends parts are curved with the same radius of curvature as the end parts.

\* \* \* \* \*